UNITED STATES PATENT OFFICE.

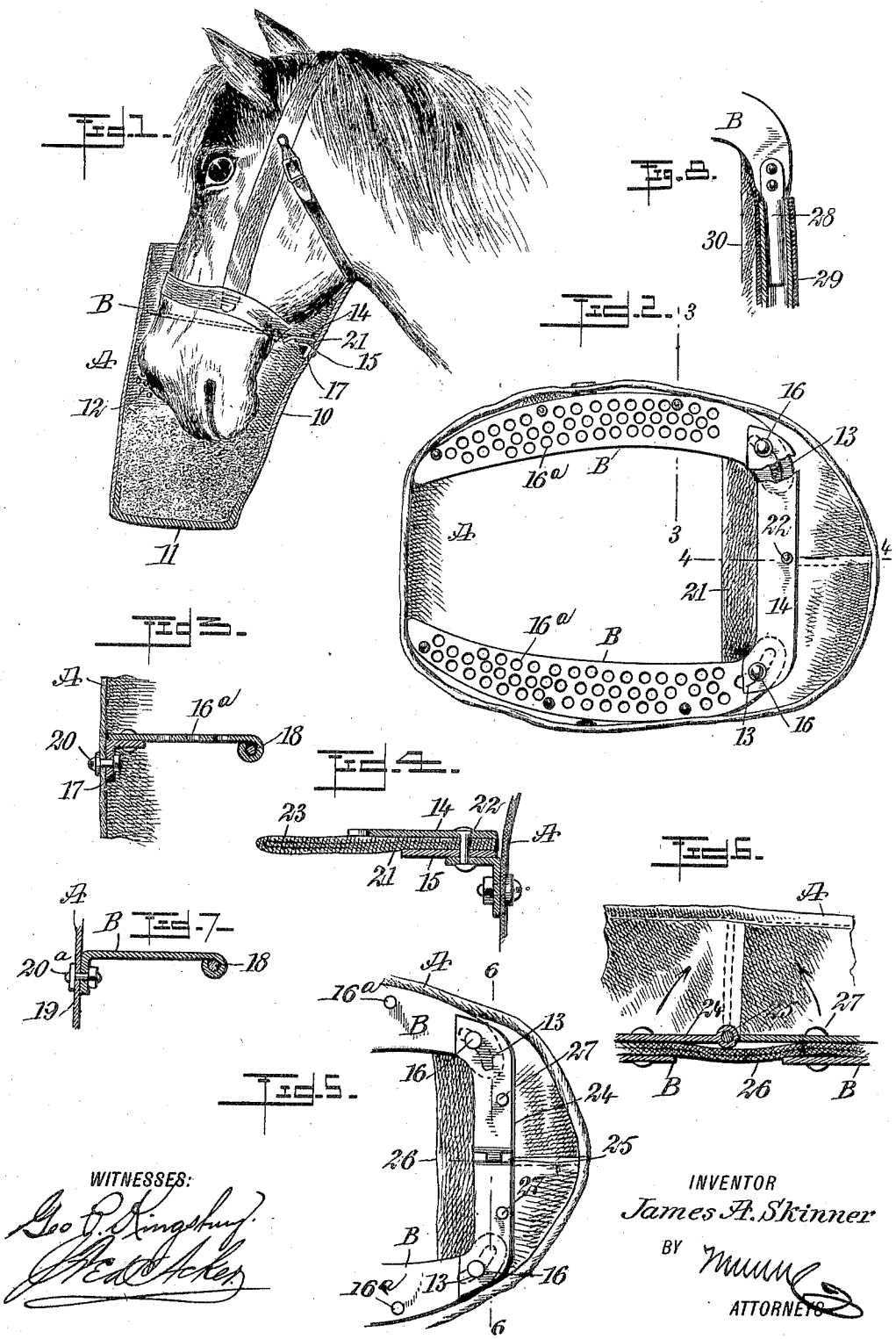

JAMES A. SKINNER, OF DENVER, COLORADO.

FEED-BAG.

No. 811,450.  Specification of Letters Patent.  Patented Jan. 30, 1906.

Application filed April 18, 1905. Serial No. 256,199.

*To all whom it may concern:*

Be it known that I, JAMES A. SKINNER, a citizen of the United States, and a resident of Denver, in the county of Denver and State of Colorado, have invented a new and Improved Feed-Bag, of which the following is a full, clear, and exact description.

The purpose of my invention is to provide a feed-bag for animals, particularly horses, which will be simple, durable, and economic and so constructed as to effectually prevent waste of feed and so that free and perfect ventilation is obtained.

A further purpose of the invention is to provide a feed-bag with ventilated guard-plates or flanges interiorly placed and located at a suitable point between the bottom and the upper edge of the bag, between which guard-plates the lower portion of the animal's head is placed in feeding, said plates being automatically adjustable to that portion of the head passed between them, rendering the bag self-accommodating to different sizes of heads and permitting an animal to have perfect freedom in raising and lowering the head, yet effectually preventing the animal from tossing out or spilling the grain.

Another purpose of the invention is to so construct those portions of the guard-plates which are brought opposite the throat of the animal that a yielding surface will be presented to such part.

The invention consists in the novel construction and combination of the several parts, as will be hereinafter fully set forth, and pointed out in the claims.

Reference is to be had to the accompanying drawings, forming a part of this specification, in which similar characters of reference indicate corresponding parts in all the figures.

Figure 1 is a vertical section through the improved feed-bag, shown applied to an animal's head. Fig. 2 is a plan view of the improved bag. Fig. 3 is a transverse section taken practically on the line 3 3 of Fig. 2. Fig. 4 is a section taken substantially on the line 4 4 of Fig. 2. Fig. 5 is a partial plan view of a slightly-modified form of the bag. Fig. 6 is a vertical section taken practically on the line 6 6 of Fig. 5; and Fig. 7 is a view similar to Fig. 3, illustrating a slight modification in construction. Fig. 8 is a detail sectional view of another slight modification in the construction of the feed-bag.

The feed-bag A is of the conventional shape, and its body 10 is preferably made of canvas or a like material and its bottom 11 of leather. The said body portion 10 of the bag may be provided with the customary ventilating-apertures 12 at the front. Opposing guard-plates B are located within the said feed-bag at a point between its center and its upper edge, the said guard-plates B being at the side portions of the bag, as is best shown in Fig. 2. These guard-plates B may be made of any suitable material, a light metal, such as aluminium, being employed or other thin sheet metal, or, if desired, the said guard-plates may be made of what is known as "leatherette" or of other tough and waterproof light material.

The guard-plates B are more or less segmental and extend from a point at the rear of the bag to a point at the front, a space intervening between the front portions of the guard-plates B, as is also best shown in Fig. 2. These guard-plates at their rear ends are provided with segmental slots 13, also best shown in Fig. 2, and are connected at their rear ends by one or two plates, ordinarily two—namely, an upper plate 14 and a lower plate 15; but the lower plate may be narrower than the upper one. These connecting-plates 14 and 15 extend over the slotted ends of the guard-plates B, and pins or loose rivets 16 are passed through the connecting-plates 14 and 15 and through the slots 13 in the guard-plates, so that the space between the inner edges of the guard-plates, which inner edges are concaved, may be increased or decreased to suit the head of the animal passed between them. These guard-plates B are provided with any desired number of apertures 16ª or their equivalents. In fact, the guard-plates may be perforated or reticulated, so as to afford ample ventilation from the top of the bag to the interior when the animal is feeding.

The guard-plates may be secured to the bag in any suitable or approved manner. In Fig. 3 the means of attachment employed consists of a suitable number of angle-brackets 17, which are bolted or riveted to the bag and upon which the guard-plates B are bolted or riveted, and the inner edges of the guard-plates are curled inwardly and downwardly upon themselves, so as to present smooth surfaces to the head of the animal. The inner edges of guard-plates may be reinforced where they are curled by means of a wire 18 of suitable gage.

In Fig. 7 the inner edges of the guard-plates are shown as carried downward, forming a vertical flange 19, which flange may be continuous, or a number of small flanges may be employed, and in this instance the bolts or rivets (designated as 20 in Fig. 3 and 20ª in Fig. 7) are passed through the flange or flanges 19 and through the body of the bag.

In order that the protective devices—namely, the guard-plates B—shall not chafe the animal where they are connected by the plates 14 and 15, a pad 21 of a pliable material, such as canvas, is placed between or under said connecting-plates 14 and 15 and is held fast by means of a rivet 22 or its equivalent; but the pad may be otherwise secured. This pad 21 extends usually from one side of the bag to the other and some distance forward of the forward edges of the connecting-plates 14 and 15, as shown at 23 in Fig. 4.

It will be observed that under this construction a feed-bag is obtained which may be comfortably worn by an animal and which will afford ample ventilation and will effectually prevent any grain from spilling out when the animal tosses its head, as the guard-plates B and the connecting-plates 14 and 15 form effective barriers to the outward movement of the grain.

Any approved harness may be employed in connection with the feed-bag for the purpose of suspending it from an animal's neck.

It may be desirable to fold the feed-bag both vertically and laterally, and to procure such a result I provide the construction illustrated in Figs. 5 and 6, wherein a single plate 24 is used to connect the guard-plates B, which connecting-plate 24 is in two sections having a hinged connection 25, the outer ends of the connecting-plate being connected with the guard-plates in the same slidable manner as has been described. The throat-cushion 26 is secured to the connecting-plate 24 by rivets 27 or their equivalents, and the material of the cushion is preferably in two or more folds. The hinge for the connecting-plate 24 is of that type which breaks in one direction and is unbreakable in the opposite direction—as, for example, a rule or a spring-hinge.

Under the construction shown in Fig. 8 instead of the connecting-plates 22 being employed a tube 29 is substituted, and fingers 28 are secured to the rear ends of the guard-plates B, which fingers 28 move loosely in the tube 29. The said tube 29 is usually covered with rubber or a pliable material, and a cushion 30 is secured to the guard-plates B, extending below the said tube, the cushion 30 corresponding to the cushions 21 and 26, hereinbefore described.

Having thus described my invention, I claim as new and desire to secure by Letters Patent—

1. In a feed-bag, apertured guard-plates secured to the inner side portions of the bag, said plates being separated at the front, a connecting medium for the rear portions of the plates, and a cushion of yielding material carried by the said connecting medium.

2. In a feed-bag, apertured guard-plates secured to the inner side portions of the bag, which plates are separated at the front, and a connecting element having sliding relation to the guard-plates.

3. In a feed-bag, apertured guard-plates conforming to the contour of and secured to the inner side portions of the bag, which guard-plates are separated at the front of the bag, a connecting-plate at the rear of the bag, independent thereof and connected with and having end movement upon the rear portions of the guard-plates.

4. In a feed-bag, apertured guard-plates conforming to the contour of and secured to the inner side portions of the bag, which guard-plates are separated at the front of the bag, a connecting-plate at the rear of the bag, independent thereof and connected with and having end movement upon the rear portions of said guard-plates, and a cushion of a yielding material carried by the connecting-plate and extending beyond its forward edge.

5. In a feed-bag, apertured guard-plates horizontally located within the bag and secured to its inner side faces, the inner edges of the said guard-plates being concaved and their forward ends separated, their rear ends being provided with longitudinal slots, a connecting-plate the ends whereof extend over the slotted ends of the guard-plates, and pins secured to the connecting-plate, which pins are loosely passed through the slots in the guard-plates.

6. In a feed-bag, apertured guard-plates horizontally located within the bag and secured to its inner side faces, the inner edges of the said guard-plates being concaved and their forward ends separated, their rear ends being provided with longitudinal slots, a hinged connecting-plate, the ends whereof extend over the slotted ends of the guard-plates, pins secured to the connecting-plates and loosely passed through the slots in the guard-plates, and a cushion carried by the connecting-plate and extending beyond the forward edge of the same.

In testimony whereof I have signed my name to this specification in the presence of two subscribing witnesses.

JAMES A. SKINNER.

Witnesses:
 JNO. M. RITTER,
 F. W. HANAFORD.